United States Patent Office 2,694,686
Patented Nov. 16, 1954

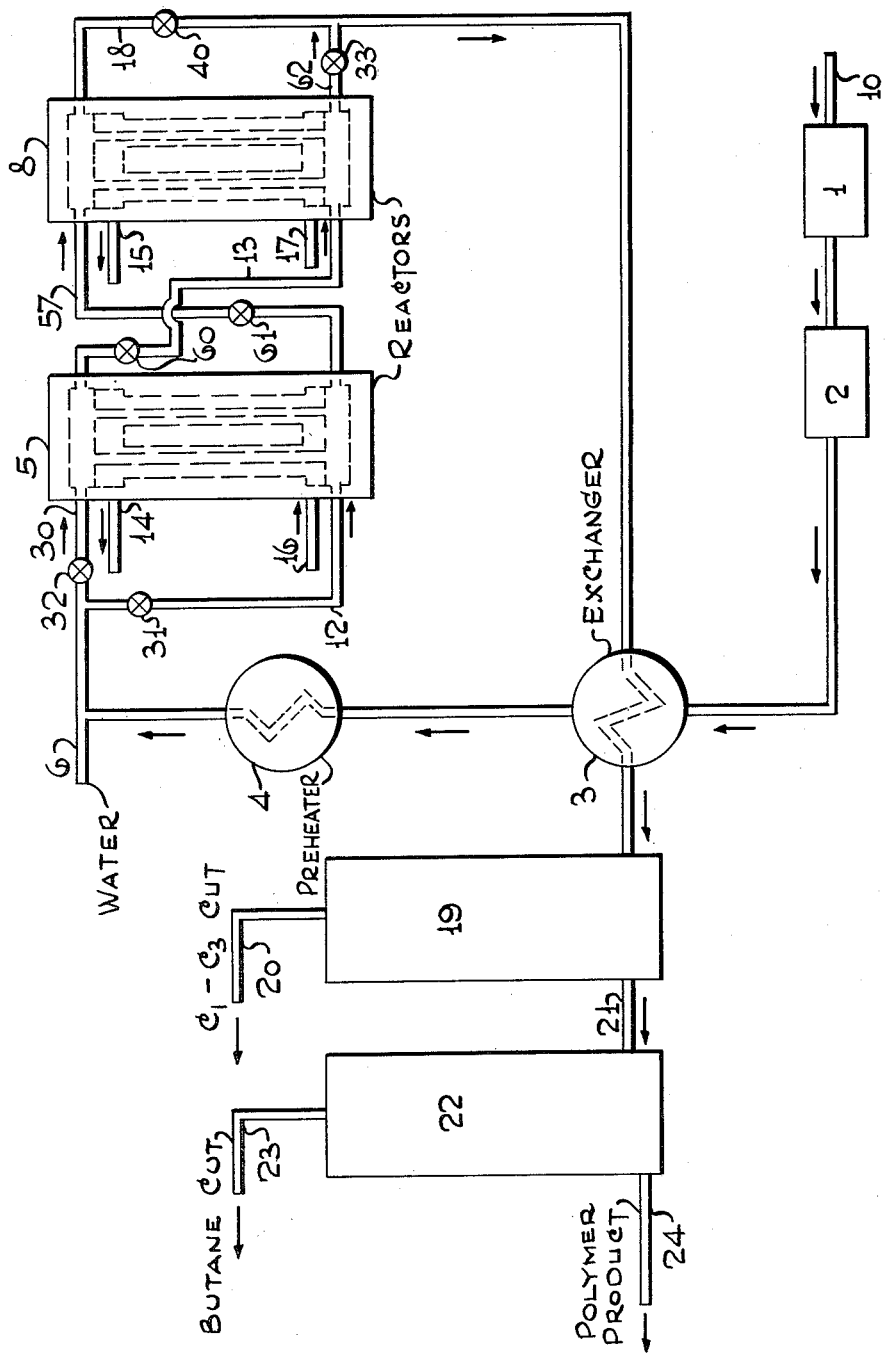

2,694,686

PHOSPHORIC ACID CATALYSTS COMPRISING A CALCINED SILICON PHOSPHORIC BASE

Edward D. Reeves and Kenneth K. Kearby, Cranford, N. J., assignors to Standard Oil Development Company, a corporation of Delaware Application December 1, 1950, Serial No. 198,548

2 Claims. (Cl. 252—435)

The present invention is concerned with an improved catalyst for carrying out chemical reactions. The invention is more particularly concerned with the polymerization of olefins using an improved polymerization catalyst having a high activity and a strong structural formation. In accordance with the present invention, an improved catalyst is secured by calcining mixtures of silica and an acid of phosphorus at elevated temperatures to form a silicon phosphate support which is subsequently impregnated with an acid of phosphorus.

It is well known in the art to use various phosphoric acid type catalysts supported on suitable solid carriers for carrying out chemical reactions. For instance, it is well known in the art to treat olefins and olefin-containing streams with various catalysts, as for example, with acids of phosphorus in order to polymerize the olefins to higher boiling hydrocarbon constituents. In general, the feed streams comprise normally gaseous olefins, such as propylene, butylenes, pentylenes and mixtures thereof, which are polymerized to hydrocarbon constituents which boil in the range below about 420° F. Although 100% olefinic streams may be utilized as feed stocks, it is generally preferred to have paraffinic diluents present in a concentration in the range of from about 20% to 80% by weight in order to reduce the formation of carbonaceous deposits on the catalyst and to provide better temperature control in the catalyst bed. The phosphoric acid in the catalyst is usually deposited on solid carriers, as for example, kieselguhr, diatomaceous earth, precipitated silica, silica gel and the like. In general, these catalysts are satisfactory for securing the polymerization of the olefins in the feed stream. However, there exist certain inherent disadvantages with respect to their use in that their structural strength is relatively low, resulting in disintegration of the catalysts and excessive pressure build up, resulting in the necessity for discontinuing the operation. This disintegration of the catalyst is particularly harmful in fixed bed types of operations, especially wherein the catalyst is disposed in relatively long tubular elements having relatively small diameters. In accordance with the present invention, an improved operation is secured providing the catalyst utilized is prepared by calcining the solid carrier and the phosphoric acid at an elevated temperature to form a silicon phosphate support, which support is subsequently impregnated with an acid of phosphorus.

The present invention may be readily understood by reference to the diagrammatical drawing illustrating one embodiment of the same. Referring specifically to the drawing illustrating a fixed bed chamber and tubular operation, feed gases comprising C₃ and C₄ olefins are introduced into the system by means of line 10. Hydrogen sulphide is removed from the gases in zone 1 and mercaptans removed in zone 2 by any suitable means. Other feed impurities may be removed in these or additional treating stages. The feed gases, free of harmful impurities, are passed through heat exchanger zone 3, preheated to the desired temperature in zone 4 and introduced into the bottom of reactor 5 by means of line 12. Water may be added to the feed gases in order to help maintain catalyst activity by means of line 6. The feed gases flow upwardly in zone 5; are removed from the top of zone 5 by means of line 13 and introduced into the bottom of reactor 8. Since the polymerization reaction is highly exothermic, and since reactor temperature control is very important in terms of catalyst life and polymer quality, the desired temperature in the reactors is maintained by means of water circulation which is introduced into reactors 5 and 8 by means of lines 16 and 17 respectively. Water or steam is withdrawn from the respective reactors by means of lines 14 and 15. The tubes of reactors 5 and 8 contain a suitable polymerization catalyst, as for example, phosphoric acid deposited on a solid siliceous carrier, as for example, silica gel or kieselguhr prepared in accordance with the present invention.

The reaction product is removed from the top of reactor 8 by means of line 18, passed through heat exchanger 3 and introduced into stabilization zone 19. Hydrocarbons boiling in the range of propane and lower are removed overhead from stabilizer 19 by means of line 20 while the higher boiling constituents are removed by means of line 21 and introduced into a debutanizer unit 22. Butane is removed overhead from zone 22 by means of line 23 while the higher boiling constituents are removed by means of line 24. Zones 19 and 22 may comprise any suitable number and arrangement of stages. This polymer product stream removed by means of line 24 may be fractionated in order to secure the desired boiling range product or further refined and handled as desired.

The method of operation may be either upflow or downflow with respect to the reaction chambers. A preferred adaptation is to employ an upflow operation alternating with a downflow operation. If this type of operation be carried out, the feed gases, after being introduced into zone 5 by means of line 12 for a fixed period of time, are introduced into zone 5 by means of line 30 for a fixed period of time. The desired method of introducing these gases is controlled by valves 31 and 32 positioned in lines 12 and 30 respectively and by means of valves 60 and 61 positioned in lines 13 and 57 respectively. The gases flow downwardly in zone 5 and are withdrawn from the bottom of the zone by means of line 57 and introduced into the top of zone 8. The reaction product is withdrawn from the bottom of zone 8 by means of line 62 and handled as hereinbefore described.

The invention is broadly concerned with an improved phosphoric acid type catalyst deposited on a siliceous carrier prepared by calcining the siliceous carrier with phosphoric acid at an elevated temperature followed by impregnating the resultant silicon phosphate support with phosphoric acid. Although the invention has been described with respect to a fixed bed process, it is to be understood that the catalyst of the present invention may be utilized in a fluidized solids process wherein the solid catalytic particles are maintained in a fluid condition by the velocity of unflowing gases. Under these conditions the size of the catalyst particles is usually below about 200 microns. Usually, at least 50% of the catalyst has a micron size in the range from about 20 to 80. The linear superficial gas velocities are from about 2.5 to 4 ft. per second, however, the superficial velocity of the upflowing gases may vary from about 1 to 5 and higher. Under these conditions, with the superficial velocities as given, a fluidized bed is maintained wherein in the lower section of the reactor, a dense catalyst phase exists while in the upper area of the reactor a dispersed phase exists. The improved catalyst of the present invention may also be employed in a slurry type operation wherein finely divided catalyst particles are suspended in or slurried in the fluid reactants, at pressures which may be above the critical. It is also to be understood that the improved catalyst of the present invention may be employed in other reactions, as for instance alkylation processes and isomerization operations.

Any type of siliceous support may be employed but it is preferred to utilize a silica gel carrier or a support having a high degree of purity with respect to silica such as kieselguhr. If silica gel be employed, the silica gel may be prepared by any conventional procedure. One method is to add a solution of sodium silicate to sulfuric acid resulting in the formation of a sol which in turn sets to a gel. The gel will contain from about 80 to 90% of water and is washed either before or after drying in order to free it of sodium sulfate prior to calcining. After calcining the silica gel, preferably at a temperature in the range from 250° F. to 1250° F., the calcined gel is pulverized and mixed in a ball mill with phosphoric acid. As mentioned various acids of phosphorous may be used, as for example, orthophosphoric acid, pyrophosphoric acid, and polyphosphoric acids.

The amount of phosphoric acid employed in the preparation of the solid support of the present invention may vary appreciably, depending upon various operating conditions. The amount utilized is preferably measured as the phosphorus to silicon ratio in the support. Thus, the amount of silica and phosphoric acid used is of such magnitude that the phosphorus to silicon atomic ratio will be from about .5 to 6 and higher. A preferred atomic ratio of phosphorus to silicon is in the range of about 2 to 4.

In accordance with the broadest concept of the present invention, the siliceous carrier-phosphoric acid base is calcined at a temperature above 1200° F., preferably at a temperature above 1400° F., in the range of about 1600° F. to 1800° F. It is preferred that the temperature not exceed about 2000 to 2500° F. due to the fact an excess amount of phosphoric acid is lost. If too low a temperature be utilized the desired structural strength of the catalyst is not secured. The siliceous-phosphoric acid mixture is calcined at the elevated temperature for a period in excess of about 15 minutes, preferably for a period of from about 1 to 5 hours.

In accordance with one specific concept of the present invention, particularly when utilizing silica gel, it is desirable to dry the gel at a temperature in the range of about 200° F. to 500° F. before mixing with phosphoric acid. A very desirable drying temperature is in the range from about 375° F. to 410° F.

The amount of phosphoric acid added to the silicon phosphate support may be varied appreciably, but the quantity is generally in the range of from about 10 to 60% by weight. A preferred amount of phosphoric acid to be added is in the range of from about 15% to 35% by weight.

If the catalyst of the present invention be employed in an olefin polymerization operation, the feed streams for the polymerization operation are preferably normally gaseous hydrocarbons containing low molecular weight olefins. Various inert diluents may be present. A preferred feed stream comprises one which contains from about 30 to 50% of olefins. Although the polymerization temperature may be in the range from about 300° F. to 900° F., a preferred polymerization temperature is in the range from about 400° F. to 500° F. Polymerization pressures likewise may vary widely, as for example, in the range from about 50 lbs. per square inch gauge to 1500 lbs. per square inch gauge. Desirable pressures are in the range from about 300 to 1000 lbs. per square inch gauge. Feed rates may vary depending upon other operating conditions. In general, the feed rates are in the range from about .2 to 10 volumes of liquefied gas per volume of catalyst per hour.

In order to maintain the activity of the catalyst at high levels for long operating periods, it may be necessary to inject continuously or at frequent intervals into the reactor containing the catalyst, small amounts of water in order to prevent dehydration of the catalyst. This water may be added in one of several ways. It may, if desired, be pumped directly into the inlet of the catalyst bed or metered streams may be employed. Another alternative is to contact the feed with water maintained at a suitable temperature. If the latter mehod is employed, the water for feed saturation is usually held at a temperature of from about 90° F. to 180° F. depending on operating conditions. An amount of water equivalent to from about .1 to 2 gallons of water per thousand gallons of feed is usually required.

The present invention may be more readily understood by the following example illustrating embodiments of the same.

*Example I*

A silicon phosphate base, having the composition of 59 parts by weight $H_3PO_4$–21 parts by weight $SiO_2$, was prepared by mixing 1053 grams of silica gel with 3314 grams of 85% ortho phosphoric acid for 18 hours in a ball mill. The mixture was dried four hours at 250° F. and then at 400° F. for about twenty-four hours. The dried granules were screened to 4–14 mesh size and calcined three hours at 1600° F. The cooled granules were impregnated with a solution of 620 grams of 85% $H_3PO_4$ and 688 grams of water and the excess solution drained. The resulting wet granules were dried four hours at 250° F. and 35 hours at 400° F. to give a catalyst containing 32.3% of added $H_3PO_4$ of which 18.6% was "free" $H_3PO_4$ (acid titratable as $H_3PO_4$ after three-minute soaking in water). This calcined catalyst was employed in a polymerization operation wherein the temperature was 450° F.; the feed rate one gallon per lb. of catalyst per hour and the pressure 1000 lbs. per square inch. The feed comprised 45 to 46% olefins and water was added at a rate of 0.3 gallon per thousand gallons of feed. The conversion secured was 76%. In a similar operation employing a catalyst comprising 75% phosphoric acid by weight on 25% kieselguhr, the conversion secured was 75%. This latter catalyst did not comprise a calcined silicon-phosphate base.

*Example II*

Various silicon phosphate base catalysts were prepared in accordance with the present invention wherein the atomic ratio of phosphorus to silicon was varied from 1.33 to 4.0 before calcining. The silica gel-phosphoric acid mixture was dried four hours at 250° F. and then at 400° F., for about 24 hours. The dried granules were calcined for three hours at 1600° F. and cooled. The cooled granules were mixed with 20 weight per cent ortho-phosphoric acid. These catalysts were then employed in a polymerization reaction, the temperature of which was 450° F., at 0 p. s. i. g. The feed comprised 45% $C_3$ and $C_4$ olefins. The feed rate was 45 volumes of gas per volume of catalyst per hour. The results of these operations are as follows:

PHOSPHORUS TO SILICON RATIO IN SUPPORT

| | | | |
|---|---|---|---|
| Original Mixture | 1.33 | 2.0 | 4.0 |
| After Calcination, 1,600° F | 1.2 | 1.7 | 2.0 |
| Added $H_3PO_4$, wt. percent | 20 | 20 | 20 |
| Olefin Conversion | 57 | 65 | 65 |

From the above it is apparent that a desirable phosphorus to silicon ratio is about 2.0 since under these conditions a maximum olefin conversion is secured with a minimum loss of a phosphoric acid during the calcination step.

*Example III*

Catalysts were prepared as described in Example II, except that the calcining temperatures were 800° F. and 1200° F. These catalysts, when immersed in water, disintegrated.

*Example IV*

Phosphoric acid and silica were mixed, dried at a temperature of about 400° F. and then calcined at 1600° F. The silicon phosphate base comprised about 59% phosphoric acid and 21% silica. This base was mixed 80% base and 20% phosphoric acid.

A similar catalyst was prepared except that the amount of the base employed was 69% and 31% phosphoric acid.

These catalysts were employed to polymerize olefins wherein the feed comprised 45 to 48 weight per cent of olefins. The feed rate was one gallon of feed per hour per pound of catalyst. The olefins comprised $C_3$ and $C_4$ olefins. The temperature in the polymerization operation was 450° F. while the pressure was 1000 lbs. per sq. in. gauge. Water was added at a rate of .37 gallon of water per 1000 gallons of feed.

The results of the operation are as follows:

| Silicon Phosphate Base | Hrs. Run | Conv. | Crush. Strength | |
|---|---|---|---|---|
| | | | Init. | Final |
| $20H_3PO_4$–$80(59H_3PO_4$–$21SiO_2)$ | 15 | 76 | 3.1 | 2.8 |
| $31H_3PO_4$–$69(59H_3PO_4$–$21SiO_2)$ | 48 | 70 | 2.5 | 2.3 |

From the above it is apparent that the conversion secured was satisfactory and that the strength of the catalyst did not appreciably deteriorate.

The initial crushing strengths of 75% phosphoric acid on kieselguhr type catalyst without calcination are in the range from 1 to 2.

Example V

A catalyst comprising 79% phosphoric acid and 21% silica gel was prepared except that the same was not calcined. This catalyst was employed in a polymerization reaction at a temperature of 450° F. and at 1000 lbs. pressure. The length of the run was about 88 hours. The feed comprised 46 to 48 weight per cent of $C_3$–$C_4$ olefins. Water was added at a rate of 0.28 gallons per thousand gallons of feed. The crushing strength of this catalyst was as follows:

| Crushing Strength, Kg. | |
|---|---|
| Initial | Final |
| 4.7 | 0.8 |

From the above it is apparent that calcination of the catalyst in accordance with the present invention is very desirable.

Having described the invention it is claimed:

1. An improved process for preparing an olefin polymerization catalyst which comprises mixing an acid of phosphorus and silica gel providing an atomic ratio of phosphorus to silica gel of about 2 to 4, drying the said mixture, calcining the dried mixture at a temperature of about 1600° F., cooling the calcined mixture, impregnating the cooled mixture with about 10 to 60 per cent by weight of additional acid of phosphorus, and then drying the resulting impregnated mixture.

2. The process defined by claim 1 in which the said acid of phosphorus is phosphoric acid.

References Cited in the file of this patent

UNITED STATES PATENTS

| Number | Name | Date |
|---|---|---|
| 2,275,182 | Ipatieff et al. | Mar. 3, 1942 |
| 2,301,052 | Kirn et al. | Nov. 3, 1942 |
| 2,347,955 | Korpi | May 2, 1944 |
| 2,496,621 | Deery | Feb. 7, 1950 |
| 2,569,092 | Deering | Sept. 25, 1951 |
| 2,575,457 | Mavity | Nov. 20, 1951 |